United States Patent
Huang

(10) Patent No.: US 8,115,823 B2
(45) Date of Patent: Feb. 14, 2012

(54) IMAGE PROCESSING SYSTEM CAPABLE OF REDUCING IMAGE DATA NEEDED TO BE TRANSMITTED AND METHOD THEREOF

(75) Inventor: Han-Cheng Huang, Taipei County (TW)

(73) Assignee: Silicon Motion Inc., Jhubei, Hsinchu County (TW)

( * ) Notice: Subject to any disclaimer, the term of this patent is extended or adjusted under 35 U.S.C. 154(b) by 436 days.

(21) Appl. No.: 12/420,068

(22) Filed: Apr. 8, 2009

(65) Prior Publication Data

US 2010/0134666 A1 Jun. 3, 2010

(30) Foreign Application Priority Data

Nov. 28, 2008 (TW) .............................. 97146313 A

(51) Int. Cl.
*H04N 5/235* (2006.01)
(52) U.S. Cl. .................................................... 348/222.1
(58) Field of Classification Search ............... 348/222.1, 348/231.6, 374
See application file for complete search history.

(56) References Cited

U.S. PATENT DOCUMENTS

| 5,959,656 A * | 9/1999 | Dhong et al. | 347/254 |
| 2007/0058209 A1 * | 3/2007 | Toura | 358/448 |
| 2007/0080969 A1 * | 4/2007 | Yamaura | 345/535 |
| 2009/0190832 A1 * | 7/2009 | Miyakoshi et al. | 382/173 |

* cited by examiner

*Primary Examiner* — Gevell Selby
(74) *Attorney, Agent, or Firm* — Winston Hsu; Scott Margo

(57) ABSTRACT

An image processing system includes a first image processing unit and a second image processing unit. The first image processing unit is utilized for receiving a plurality of images, and the first image processing unit divides a $(K+N)^{th}$ image into a plurality of regions according to a $K^{th}$ image and a $(K+M)^{th}$ image, where K, M and N are positive integers and N is greater than M. The first image processing unit further transmits image data corresponding to a first region of the plurality of regions to the second image processing unit.

24 Claims, 6 Drawing Sheets

|  | Region 2 | Region 3 | Region 4 | Region 5 |
|---|---|---|---|---|
| Third image | 5 | 3 | 3 | 1 |
| Fourth image | 4 | 2 | 3 | 1 |
| Fifth image | 3 | 2 | 2 | 1 |

FIG. 4

IMAGE PROCESSING SYSTEM CAPABLE OF REDUCING IMAGE DATA NEEDED TO BE TRANSMITTED AND METHOD THEREOF

BACKGROUND OF THE INVENTION

1. Field of the Invention

The present invention relates to an image processing system, and more particularly, to an image processing system and an associated image processing method capable of reducing image data needed to be transmitted.

2. Description of the Prior Art

In a conventional image processing system, an image sensed by an image sensor is transmitted to a first image processing unit. Then, the image in the first image processing unit is divided into several macro-blocks, and the macro-blocks are sequentially transmitted to a second image processing unit and are performed image processing operations to become frame data. After that, a display receives the frame data outputted from the second image processing unit and displays the images. In addition, a USB (Universal Serial Bus) generally serves as a transmission medium between the first and second image processing units, where the transmission capability of USB 2.0 and USB 1.0 are 480 Mbps (Megabits per second) and 120 Mbps, respectively. However, with a higher resolution of the image, the image data are unable to be transmitted to the second image processing unit immediately due to a limitation of the transmission capability of the transmission medium. Therefore, the images displayed on the display seem to be discontinuous, and the display quality is degraded.

SUMMARY OF THE INVENTION

It is therefore an objective of the present invention to provide an image processing system and an associated image processing method capable of reducing the image data needed to be transmitted, in order to solve the above-mentioned problem.

According to one embodiment of the present invention, an image processing system is disclosed. The image processing system comprises a first image processing unit and a second image processing unit. The first image processing unit is utilized for receiving a plurality of images, and the first image processing unit divides a $(K+N)^{th}$ image into a plurality of regions according to a $K^{th}$ image and a $(K+M)^{th}$ image, where K, M and N are positive integers and N is greater than M. The first image processing unit further transmits image data corresponding to a first region of the plurality of regions to the second image processing unit.

According to another embodiment of the present invention, an image processing method is disclosed. The image processing method comprises: receiving a plurality of images sequentially; dividing a $(K+N)^{th}$ image into a plurality of regions according to a $K^{th}$ image and a $(K+M)^{th}$ image, where K, M and N are positive integers and N is greater than M; and transmitting image of corresponding to a first region of the plurality of regions.

In the image processing system and the image processing method, an image is divided into a plurality of regions, and during image data transmission, the image data of only one region is transmitted to the second image processing unit at a time. Therefore, the "image looked discontinuous" issue due to insufficient bandwidth of the transmission medium can be avoided.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 4 is a diagram illustrating weight parameters corresponding to the regions 2-5 shown in FIG. 2A.

DETAILED DESCRIPTION

Figure 1:
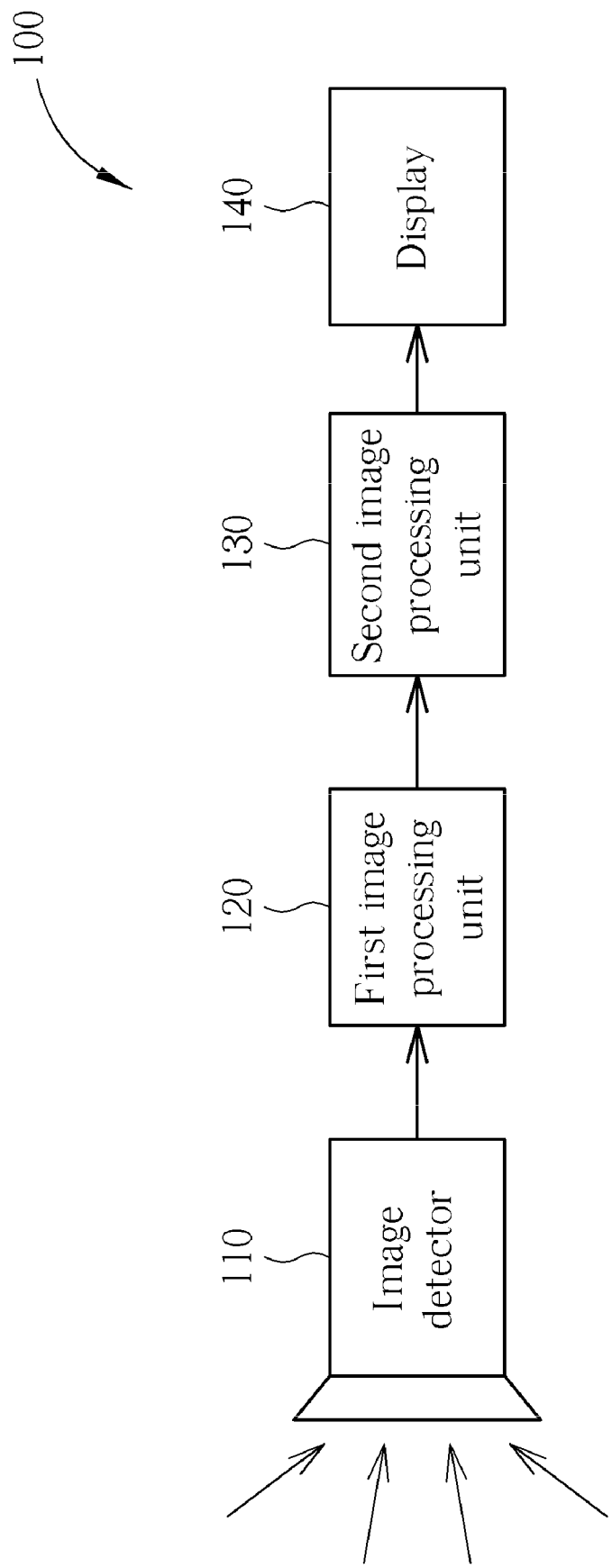
FIG. 1 is a diagram illustrating an image processing system according to one embodiment of the present invention.

FIG. 1 is a diagram illustrating an image processing system 100 according to one embodiment of the present invention. As shown in FIG. 1, the image processing system 100 includes an image detector 110, a first image processing unit 120, a second image processing unit 130 and a display 140. In practice, the image detector 110 can be a CCD (Charge Coupled Device) image detector or a CMOS (Complementary Metal-Oxide Semiconductor) image detector, and the second image processing unit 130 can be implemented by software or a driving circuit.

Figure 2A:
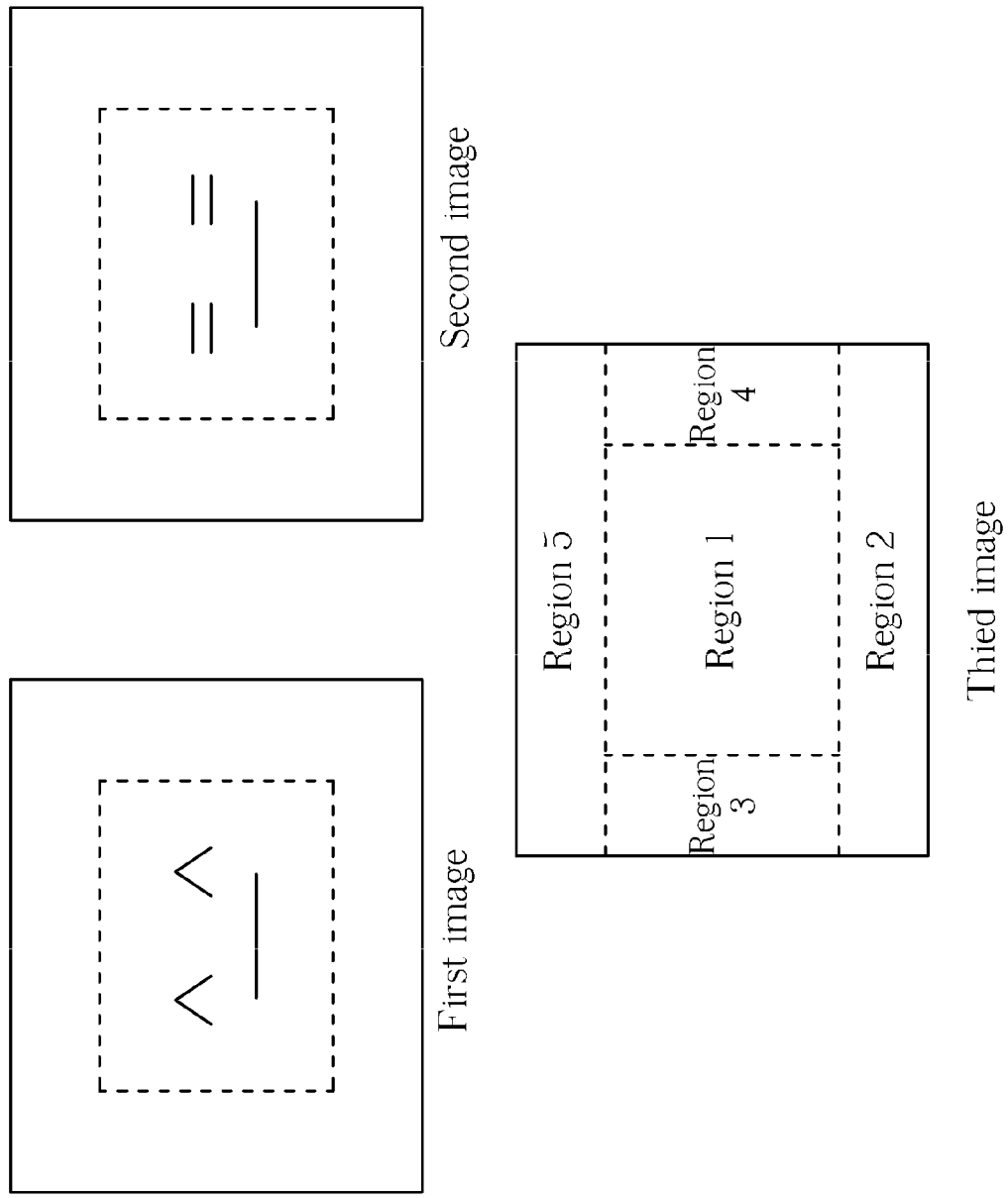
FIGS. 2A-2C are diagrams illustrating the operations of the image processing system shown in FIG. 1.
Figure 3:
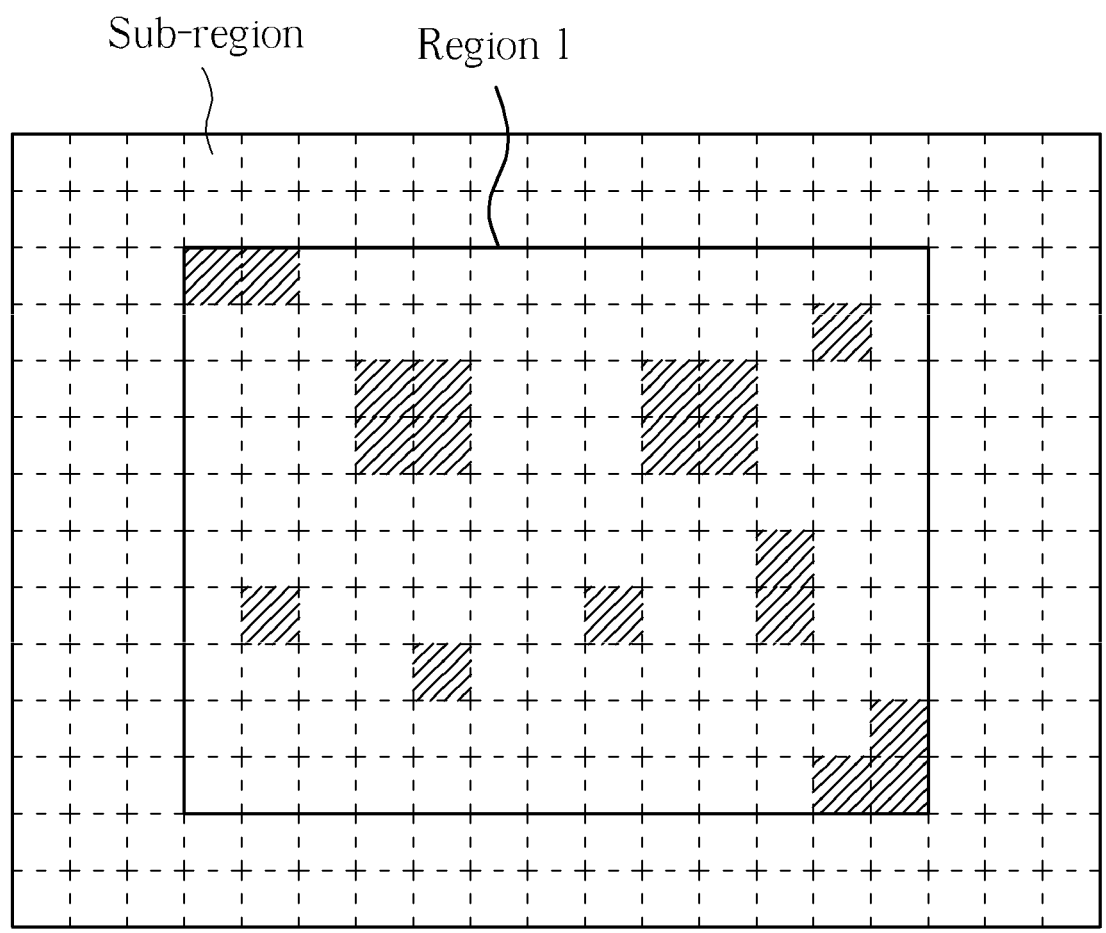
FIG. 3 is a diagram illustrating the operations of the image processing system shown in FIG. 1.

Please refer to FIG. 2A and FIG. 3. FIG. 2A and FIG. 3 are diagrams illustrating operations of the image processing system 100 shown in FIG. 1. Regarding the operations of the image processing system 100, first, the image detector 110 detects and receives a first image, and transmits the first image to the first image processing unit 120. Then, the first image processing unit 120 divides the first image into a plurality of data blocks and sequentially transmits the data blocks to the second image processing unit 130. After that, the second image processing unit 130 combines the data blocks of the first image to generate an image frame (i.e., the first image), and the display 140 receives the image frame outputted from the second image processing unit 130 and displays the image frame. Then, the image detector 110 detects and receives a second image, and the second image undergoes similar operations as the first image described above, and is displayed on the display 140.

It is noted that, each image includes the same quantity of data blocks, and the data blocks correspond to the same positions of each image, respectively. That is, the data blocks can be regarded as a plurality of sub-regions of the image, where the each dotted-line square shown in FIG. 3 is a sub-region. In addition, a size of each data block is determined according to the image compression format applied in the image processing system 100. Taking MJPEG (Motion Joint Photographic Experts Group) as an example, the data block includes 8*8 pixel data.

In addition, when the first image processing unit 120 sequentially transmits the data locks to the second image processing unit 130, at the same time, the first image processing unit 120 stores an average of pixel values of each data block into a storage unit (not shown) in the first image processing unit 120. Therefore, the storage unit stores the averages of the pixel values of each sub-region of the first and second images. In addition, in this embodiment, the average of the pixel values is an average of gray levels (or an average of luminance values). It is note that, in this embodiment, the size of the sub-region is equal to that of the data block. However, in other embodiments, the size of the sub-region can be designed according to the designer's considerations.

For example, if one data block is designed to include four sub-regions and the data block includes 8*8 pixel data, the size of the sub-region is equal to 4*4 pixel values. The first image processing unit 120 stores the averages of the pixel values of all the sub-regions of each data block into the storage unit of the first image processing unit 120. These alternative designs all fall in the scope of the present invention.

For each sub-region corresponding to the same position of the first and second image, the first image processing unit 120 compares an average of pixel values of the sub-region of the first image and an average of pixel values of the sub-region of the second image to generate a comparison result of the sub-region. Then, the first image processing unit 120 determines whether the sub-region is a specific sub-region according to the comparison result of the sub-region. In this embodiment, the comparison result is a difference between the average of the pixel values of the sub-region of the first image and the average of the pixel values of the sub-region of the second image, and the specific sub-region is a sub-region whose comparison result is greater than a predetermined value. In other words, the specific sub-region can be regarded as a sub-region having greater image data variation by comparing image data of the sub-region of the first image with image data of the sub-region of the second image. Therefore, the first image processing unit 120 determines a plurality of specific sub-regions by comparing the first image and the second image. In this embodiment, the specific sub-regions are the shaded sub-regions shown in FIG. 3.

Figure 2B:
Figure 2C:

After the plurality of specific sub-regions are determined, the first image processing unit 120 divides a third image into five regions shown in FIG. 2A, where the third image is not transmitted to the second image processing unit 130 yet. In FIG. 2A, region 1 is a rectangular region and includes all the specific sub-regions, that is, the image data of the region 1 have large variation. In addition, regions 2-5 are determined according to boundaries of the region 1. In one embodiment, regions 2 and 5 are set as regions positioned upper and lower than the region 1, respectively, and regions 3 and 4 are set as regions positioned left and right to the region 1, respectively. Please note that, the positions of the regions shown in FIG. 2A are for exemplary purposes only, and are not meant to be limitations of the present invention. In other embodiments, the third image can be divided into three regions shown in FIG. 2B, where a region 1 is the central region of the third image, regions 2 and 3 are set as regions positioned upper and lower than the region 1, respectively. In addition, in FIG. 2C, a region 1 is the central region of the third image, and regions 2-9 are positioned around the region 1.

For simplicity, only the embodiment shown in FIG. 2A is further described in detail. After the image detector 110 detects and receives the third image, and transmits the third image to the first image processing unit 120, the first image processing unit 120 merely transmits the image data of the region 1 to the second image processing unit 130. After the entire image data of the region 1 are transmitted to the second image processing unit 130, the first image processing unit 120 determines whether to transmit the image data of other regions (regions 2-5) to the second image processing unit 130 according to a bandwidth (transmission capability) of a transmission medium between the first and second image processing units 120 and 130. At the same time, the first image processing unit 120 stores averages of pixel values of each sub-region (sub-regions of the regions 1-5) into the storage unit (not shown) of the first image processing unit 120, where the average of pixel values is an average of gray levels (or an average of luminance values). In another embodiment, the first image processing unit 120 determines one or more regions whose image data should be transmitted to the second image processing unit 130 according to the bandwidth between the first and second image processing unit 120 and 130 and sizes of the image data of the regions 1-5. For example, when the bandwidth is great, the first image processing unit 120 can transmit the image data of the regions 1-5 to the second image processing unit 130; and when the bandwidth is small, the first image processing unit 120 can merely transmit the image data of the regions 1 and 2 to the second image processing unit 130. It is noted that, the first image processing unit 120 can transmit the image data of the regions at the same time or sequentially transmit the image data of the regions by a fixed sequence.

Assuming that only the image data of the region 1 are transmitted to the second image processing unit 130, then, the second image processing unit 130 combines the image data of the region 1 of the third image and the image data of the image data corresponding to the regions 2-5 of the second image to generate an image frame (i.e., the image frame serves as the third image), and the image frame is transmitted to the display 140 to be displayed thereon. Then, each subsequent image (e.g. the fourth image, the fifth image, . . . , etc.) received and detected by the image detector 110 undergoes the same operations as the third image to be divided into five regions. And then, the image data of a portion of regions are transmitted to the second image processing unit 130 and are combined with the image data of the previous image in the second image processing unit 130 to generate an image frame, and the image frame is transmitted to the display 140 to be displayed thereon.

As described above, in the image processing system 100 of the present invention, the first image processing unit 120 determines a region having greater image data variation (i.e., region 1) according to the first and second image. Then, when the third image is to be transmitted, the first image processing unit 120 merely transmits the image data of the region having greater image data variation at a first time. Accordingly, only the essential and high quality image data are transmitted through the transmission medium with limited bandwidth. Therefore, the problem of discontinuous images displayed on the display can be resolved, and the display quality will not be degraded.

However, in order to prevent non-update of the image data of the regions 2-5 during a long time, the regions 2-5 of the third image correspond to weight parameters, respectively. Please refer to FIG. 4. FIG. 4 is a diagram illustrating weight parameters corresponding to the regions 2-5 shown in FIG. 2A. As shown in FIG. 4, the predetermined weight parameters corresponding to the regions 2-5 are "5", "3", "3" and "1", respectively. After the image data of the region 1 are transmitted from the first image processing unit 120, if the bandwidth is sufficient, it is determined the image data of which region are transmitted to the second image processing unit 130 according to the weight parameters corresponding to the regions 2-5. In this embodiment, for the third image, the first image processing unit 120 initially transmits the image data of the regions 2 and 3 corresponding to greater weight parameters to the second image processing unit 130. After the image data of the regions 2 and 3 of the third image are transmitted, the weight parameters corresponding to the regions 2 and 3 are decreased by a decrement of one and become "4" and "2". Then, after the first image processing unit 120 transmits the image data of the region 1 of the fourth image to the second image processing unit 130, the first image processing unit 120 transmits the image data of the regions 2 and 4 corresponding to greater weight parameters to the second image processing unit 130, and then the weight parameters corresponding to the regions 2 and 4 are decreased by a decrement of one and become "3" and "2". Similarly, the first image processing unit 120 sequentially transmits the image data of the regions 1, 2 and 3 of the fifth image to the second image processing unit 130. If the weight parameter decreases to be "0", at the next time the weight parameter will become its predetermined value when it is required to be decreased. Therefore, the above-mentioned "non-update of the image data during a long time" can be avoided. It is noted that, although the above descriptions are only for the image divided into five regions, however, a person skilled in this art can understand how to set weight parameters corresponding to three regions shown in FIG. 2B or nine regions shown in FIG. 2C (or other quantity of regions) and how to transmit the image data of the regions according to the weight parameters after studying the above teaching of the present invention. That is, these alternative designs all fall in the scope of the present invention.

Briefly summarizing the image processing system of the present invention, a first image processing unit divides a $(K+N)^{th}$ image into a plurality of regions according to a $K^{th}$ image and a $(K+M)^{th}$ image (K, N, M are integers and N is greater than M, e.g., M=1 and N=2), and transmits image data of a first region to a second image processing unit. Then, the first image processing unit determines whether to transmit image data of other regions to the second image processing unit according a bandwidth of a transmission medium between the first and second image processing units. Therefore, discontinuous images due to the insufficient bandwidth can be avoided, and display quality is improved.

Those skilled in the art will readily observe that numerous modifications and alterations of the device and method may be made while retaining the teachings of the invention.

What is claimed is:

1. An image processing system, comprising:
   a first image processing unit, for sequentially receiving a plurality of images; and
   a second image processing unit, coupled to the first image processing unit, wherein the first image processing unit divides a $(K+N)^{th}$ image into a plurality of regions according to a $K^{th}$ image and a $(K+M)^{th}$ image, K, M and N are integers and N is greater than M, and the first image processing unit further transmits image data of a first region of the plurality of regions to the second image processing unit;
   wherein the first image processing unit determines whether to transmit image data of a second region different from the first region of the plurality of regions to the second image processing unit according to a bandwidth of a transmission medium between the first and second image processing units.

2. The image processing system of claim 1, wherein each region except the first region corresponds to a corresponding weight parameter, and the first image processing unit determines the second region according to a plurality of weight parameters.

3. The image processing system of claim 2, wherein first image processing unit determines whether to transmit image data of the regions except the first region to the second image processing unit according to the plurality of weight parameters and the bandwidth of the transmission medium.

4. The image processing system of claim 3, wherein the first image processing unit adjusts the plurality of weight parameters according to the image data transmitted from the first image processing unit to the second image processing unit.

5. The image processing system of claim 1, wherein each image of the plurality of image includes a same quantity of sub-regions, and the sub-regions correspond to same positions of the image, respectively; for each sub-region, the first image processing unit compares image data of the sub-region of the $K^{th}$ image with image data of the sub-region of the $(K+M)^{th}$ image to generate a comparison result; and the first image processing unit determines the plurality of regions of the $(K+N)^{th}$ image according to a plurality of comparison results corresponding to the sub-regions.

6. The image processing system of claim 5, wherein each sub-region comprises a plurality of pixels; and for each sub-region, the first image processing unit compares an average of pixel values of the sub-region of the $K^{th}$ image with an average of pixel values of the sub-region of the $(K+M)^{th}$ image to generate comparison result corresponding to the sub-region.

7. The image processing system of claim 6, wherein the average of the pixel values is an average of gray levels.

8. The image processing system of claim 6, wherein the first image processing unit determines a plurality of specific sub-regions among the sub-regions according to the plurality of comparison results and determines the plurality of regions according to the plurality of specific sub-regions; and for each specific sub-region, a difference between the average of the pixel values of the specific sub-region of the $K^{th}$ image and the average of the pixel values of the specific sub-region of the $(K+M)^{th}$ image is greater than a predetermined value.

9. The image processing system of claim 8, wherein the first region comprises the plurality of specific sub-regions.

10. The image processing system of claim 5, wherein each sub-region comprises A*A pixels, and A is an integer.

11. The image processing system of claim 1, wherein during image data transmission, the first image processing unit transmits image data of only one region to the second image processing unit at a time.

12. An image processing method, comprising:
   providing a first processing unit to sequentially receive a plurality of images;
   utilizing the first processing unit to divide a $(K+N)^{th}$ image into a plurality of regions according to a $K^{th}$ image and a $(K+M)^{th}$ image, where K, M and N are integers and N is greater than M;
   utilizing the first processing unit to transmit image data of a first region of the plurality of regions; and
   utilizing the first processing unit to determine whether to transmit image data of a second region different from the first region of the plurality of regions according to a bandwidth of a transmission medium.

13. The image processing method of claim 12, wherein each region except the first region corresponds to a corresponding weight parameter, and the step of dividing the $(K+N)^{th}$ image into the plurality of regions according to the $K^{th}$ image and the $(K+M)^{th}$ image comprises:
   determining the second region according to a plurality weight parameters.

14. The image processing method of claim 13, further comprising:
   determining whether to transmit image data of the regions except the first region according to the plurality of weight parameters and the bandwidth of the transmission medium.

15. The image processing method of claim 14, further comprising:
   adjusting the plurality of weight parameters according to the transmitted image data.

16. The image processing method of claim 12, wherein each image of the plurality of image includes a same quantity of sub-regions, and the sub-regions correspond to same positions of the image, respectively; and the step of dividing the $(K+N)^{th}$ image into the plurality of regions according to the $K^{th}$ image and the $(K+M)^{th}$ image comprises:

for each sub-region, comparing image data of the sub-region of the $K^{th}$ image with image data of the sub-region of the $(K+M)^{th}$ image to generate a comparison result; and determining the plurality of regions of the $(K+N)^{th}$ image according to a plurality of comparison results corresponding to the sub-regions.

17. The image processing method of claim 16, wherein each sub-region comprises a plurality of pixels, and the step of comparing the image data of the sub-region of the $K^{th}$ image with the image data of the sub-region of the $(K+M)^{th}$ image to generate the comparison result comprises:

for each sub-region, comparing an average of pixel values of the sub-region of the $K^{th}$ image with an average of pixel values of the sub-region of the $(K+M)^{th}$ image to generate the comparison result corresponding to the sub-region.

18. The image processing method of claim 17, wherein the average of the pixel values is an average of gray levels.

19. The image processing method of claim 18, wherein the step of comparing the image data of the sub-region of the $K^{th}$ image with the image data of the sub-region of the $(K+M)^{th}$ image to generate the comparison result comprises:

determining a plurality of specific sub-regions among the sub-regions according to the plurality of comparison results; and determining the plurality of regions according to the plurality of specific sub-regions, wherein for each specific sub-region, a difference between the average of the pixel values of the specific sub-region of the $K^{th}$ image and the average of the pixel values of the specific sub-region of the $(K+M)^{th}$ image is greater than a predetermined value.

20. The image processing method of claim 19, wherein the first region comprises the plurality of specific sub-regions.

21. The image processing method of claim 16, wherein each sub-region comprises A*A pixels, and A is an integer.

22. An image processing system, comprising:

a first image processing unit, for sequentially receiving a plurality of images; and a second image processing unit, coupled to the first image processing unit, wherein the first image processing unit divides a $(K+N)^{th}$ image into a plurality of regions by comparing image data of a $K^{th}$ image and image data of a $(K+M)^{th}$ image, K, M and N are integers and N is greater than M, and the first image processing unit further transmits image data of a first region of the plurality of regions to the second image processing unit.

23. An image processing system, comprising:

a first image processing unit, for sequentially receiving a plurality of images; and a second image processing unit, coupled to the first image processing unit, wherein the first image processing unit divides a $(K+N)^{th}$ image into a plurality of regions according to a $K^{th}$ image and a $(K+M)^{th}$ image, K, M and N are integers and N is greater than M, and the first image processing unit further transmits image data of a first region of the plurality of regions to the second image processing unit;

wherein during image data transmission, the first image processing unit transmits image data of only one region to the second image processing unit at a time.

24. An image processing method, comprising:

providing a first processing unit to sequentially receive a plurality of images;

utilizing the first processing unit to divide a $(K+N)^{th}$ image into a plurality of regions by comparing image data of a $K^{th}$ image and image data of a $(K+M)^{th}$ image, where K, M and N are integers and N is greater than M; and utilizing the first processing unit to transmit image data of a first region of the plurality of regions.

* * * * *